(12) United States Patent
Garlick et al.

(10) Patent No.: US 7,937,606 B1
(45) Date of Patent: May 3, 2011

(54) SHADOW UNIT FOR SHADOWING CIRCUIT STATUS

(75) Inventors: Lincoln G. Garlick, Santa Clara, CA (US); Paolo E. Sabella, San Francisco, CA (US); Samuel H. Duncan, Arlington, MA (US); Robert J. Hasslen, Menlo Park, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1284 days.

(21) Appl. No.: 11/437,112

(22) Filed: May 18, 2006

(51) Int. Cl.
G06F 1/04 (2006.01)
G06F 15/177 (2006.01)

(52) U.S. Cl. ............ 713/600; 713/1; 713/2; 713/100; 713/601; 710/19

(58) Field of Classification Search .......... 713/600, 713/1, 2, 100, 601; 710/19
See application file for complete search history.

(56) References Cited

U.S. PATENT DOCUMENTS

| | | | |
|---|---|---|---|
| 3,922,526 A | 11/1975 | Cochran | |
| 4,317,180 A | 2/1982 | Lies | |
| 4,468,748 A | 8/1984 | Blau et al. | |
| 4,615,005 A | 9/1986 | Maejima et al. | |
| 4,670,837 A | 6/1987 | Sheets | |
| 4,695,946 A | 9/1987 | Andreasen et al. | |
| 4,698,748 A | 10/1987 | Juzswik et al. | |
| 4,748,559 A | 5/1988 | Smith et al. | |
| 4,766,566 A | 8/1988 | Chuang | |
| 4,893,271 A | 1/1990 | Davis et al. | |
| 4,894,728 A | 1/1990 | Goodman | |
| 4,954,951 A | 9/1990 | Hyatt | |
| 4,963,769 A | 10/1990 | Hiltpold et al. | |
| 5,113,523 A | 5/1992 | Colley et al. | |
| 5,150,469 A | 9/1992 | Jouppi | |
| 5,153,535 A | 10/1992 | Fairbanks et al. | |
| 5,167,024 A | 11/1992 | Smith et al. | |
| 5,265,256 A | 11/1993 | Chau-Lee et al. | |
| 5,274,828 A | 12/1993 | McAdams | |
| 5,452,401 A | 9/1995 | Lin | |

(Continued)

FOREIGN PATENT DOCUMENTS

CN 1318165 A 10/2001

(Continued)

OTHER PUBLICATIONS

Colwell, R.P. et al., "A VLIW Architecture for a Trace Scheduling Compiler," IEE Transactions on Computers, IEEE, vol. 37, No. 8, pp. 967-979 (Aug. 1988).

(Continued)

*Primary Examiner* — Thomas Lee
*Assistant Examiner* — Michael J Brown
(74) *Attorney, Agent, or Firm* — Kilpatrick Townsend & Stockton LLP

(57) ABSTRACT

Generally, the present disclosure concerns systems and methods for shadowing status for a circuit with a shadow unit. In one aspect, a system comprises a first circuit in a first dynamic clock domain of a plurality of dynamic clock domains, a processor configured to execute software instructions to generate a request for a status of the first circuit, and a second circuit coupled to the first circuit and to the processor. The second circuit, outside the first dynamic clock domain, is configured to shadow a status of the first circuit and to respond to the request for the status of the first circuit with the shadowed status.

21 Claims, 4 Drawing Sheets

U.S. PATENT DOCUMENTS

| | | | |
|---|---|---|---|
| 5,630,143 A | 5/1997 | Maher et al. | |
| 5,655,124 A | 8/1997 | Lin | |
| 5,787,297 A | 7/1998 | Lin | |
| 5,940,785 A | 8/1999 | Georgiou et al. | |
| 6,047,248 A | 4/2000 | Georgiou et al. | |
| 6,105,139 A | 8/2000 | Dey et al. | |
| 6,247,134 B1 | 6/2001 | Sproch et al. | |
| 6,256,743 B1 | 7/2001 | Lin | |
| 6,301,671 B1 | 10/2001 | Boice et al. | |
| 6,430,693 B2 | 8/2002 | Lin | |
| 6,438,700 B1 | 8/2002 | Adusumilli | |
| 6,584,570 B2* | 6/2003 | Pan et al. | 713/300 |
| 6,671,815 B2 | 12/2003 | Iwamura et al. | |
| 6,919,900 B2 | 7/2005 | Wilt | |
| 6,950,106 B2 | 9/2005 | Torii et al. | |
| 7,081,896 B1 | 7/2006 | Rao | |
| 7,082,543 B2 | 7/2006 | Lin | |
| 7,533,132 B2* | 5/2009 | Schaefer et al. | 707/203 |
| 7,685,439 B2 | 3/2010 | Drescher | |
| 2002/0073369 A1 | 6/2002 | How et al. | |
| 2002/0152105 A1* | 10/2002 | Dan et al. | 705/8 |
| 2004/0249985 A1* | 12/2004 | Mori et al. | 709/250 |
| 2005/0235135 A1 | 10/2005 | Dao et al. | |
| 2005/0251782 A1* | 11/2005 | Rodrigues et al. | 717/100 |
| 2006/0132491 A1 | 6/2006 | Riach | |

FOREIGN PATENT DOCUMENTS

| | | |
|---|---|---|
| CN | 1653407 A | 8/2005 |
| DE | 4040382 A1 | 7/1991 |
| EP | 0284364 A3 | 9/1988 |
| EP | 0442240 A2 | 8/1991 |
| JP | 54-014624 | 2/1979 |
| JP | 58-062720 | 4/1983 |
| JP | 63-026716 | 2/1988 |
| JP | 63-175910 | 7/1988 |
| JP | 1-155459 | 6/1989 |
| JP | 2-066616 | 3/1990 |
| JP | 3-010306 | 1/1991 |
| JP | 58-182760 | 10/1993 |
| JP | 2001-188628 A | 7/2001 |
| JP | 2003-271986 A | 9/2003 |
| JP | 2005-038186 A | 2/2005 |

OTHER PUBLICATIONS

Dobberpuhl, D. et al., "A 200MHz 64b Dual-Issue CMOS Microprocessor," 1992 IEEE International Solid-State Circuits Conference Digest of Papers, IEEE, First Edition, IEEE Catalog No. 92CH3128-6, pp. 106-107 (Feb. 1992).

Towler, J. et al., "A 128k 6.5ns Access/5ns Cycle CMOS ECL Static RAM," 1989 IEE International Solid-State Circuits Conference Digest of Technical Papers, IEEE, First Edition, ISSN No. 0193-6530, pp. 30-31 and 280 (Feb. 1989).

Wirbel, L., "AMD about to announce 80486 clone," Electronic Engineering Times, A CMP Publication, pp. 1 and 8 (Jan. 13, 1992).

* cited by examiner

SHADOW UNIT FOR SHADOWING CIRCUIT STATUS

CROSS-REFERENCES TO RELATED APPLICATIONS

The present application is related to co-pending U.S. patent application Ser. No. 10/901,887, filed Jul. 28, 2004, entitled "Isochronous Pipelined Processor with Deterministic Control," and U.S. Provisional Patent Application 60/794,221, filed Apr. 20, 2006, entitled "Work Based Clock Management for Display Sub-System," which applications are incorporated by reference herein as if set forth fully.

BACKGROUND OF THE INVENTION

FIG. 1 is a generalized block diagram of a computer system 100 in the prior art. In the computer system 100, central processing unit (CPU) 105 communicates via bus interface 110 to system memory 115. I/O interface 130 receives user input from one or more user input devices 135 and forwards the input to CPU 105. Visual output is provided on display device 145 by way of graphics subsystem 140. System disk 120 is connected to I/O interface 130 or bus interface 110.

Clock generator 150 supplies clocks at a variety of frequencies to the various components of computer system 100. For example, clock generator 150 may provide a number of different clocks (e.g., at different frequencies) to drive the various hardware circuits within graphics subsystem 140. Clock generator 150 may supply a digital-to-analog converter (DAC, not shown) in graphics subsystem 140 with various clocks so that the DAC can generate an analog signal to display device 145, and may supply another circuit component such as I/O interface 130 with other clocks. The clocks are needed so that the various hardware circuitry in computer system 100 may perform their respective functions.

At any point in time, some circuitry modules in computer system 100 may be idle and not performing a useful function. While the module is idle, computer system 100 may disable clocks to the idle module in order to save power. For example, to extend battery life where computer system 100 is a laptop PC, a software power management component running on CPU 105 may command clock generator 150 to disable one or more of the clocks supplied to the idle module.

However, each of the individual software components running on CPU 105 may not always be coordinated or "aware" of the exact state of the modules in computer system 100. For example, a driver software component may operate independently of the power management software component. The driver may get stuck in a loop attempting to read status of an idle module, because if the idle module's clock is disabled, the module will not respond to the driver's request for status information. If the driver does not receive status information from the module, the driver may keep attempting to read the status of the module. In another example, to service an interrupt, an interrupt service routine running on CPU 105 might need to read registers in various modules distributed across computer system 100 to determine why the interrupt occurred, e.g., because of a context switch, an error, or a software semaphore that indicates that an event has concluded. The interrupt service routine might get stuck in a loop attempting to read status from idle modules, or may time out doing so.

Therefore, because each of the individual software components running on CPU 105 may be uncoordinated relative to the hardware modules in computer system 100, computer system 100 may require modules to remain on so that drivers, interrupt service routines, and the like can read the status of the modules. A module may be required to remain on even if the module might otherwise be disabled as not actively performing a useful function. Keeping the module on unnecessarily consumes power in computer system 100.

BRIEF SUMMARY OF THE INVENTION

Generally, the present disclosure concerns systems and methods for shadowing status for a circuit with a shadow unit. In one aspect, a system comprises a first circuit in a first dynamic clock domain of a plurality of dynamic clock domains, a processor configured to execute software instructions to generate a request for a status of the first circuit, and a second circuit coupled to the first circuit and to the processor. The second circuit, outside the first dynamic clock domain, is configured to shadow a status of the first circuit and to respond to the request for the status of the first circuit based on the shadowed status.

In an exemplary embodiment, the circuit is a power managed module in a graphics engine partitioned into one or more dynamic clock domains. The shadow unit is a clock management unit, where the clock management unit can independently enable or disable each dynamic clock domain according to whether the dynamic clock domain will be operative or idle in an upcoming period. The clock management unit is a relatively low power device that is always enabled in some embodiments. Status information for each dynamic clock domain in the graphics engine may be shadowed to the clock management unit, for example by saving the status information to one or more registers in the clock management unit. Software running on a processor in the system can therefore read the status of the power managed module in the graphics engine by reading the shadowed status information from the clock management unit.

In some embodiments, the shadow unit is "upstream" of the "downstream" power managed module. The shadow unit stores status and acts as a shadow for the status of the downstream unit. In an exemplary embodiment, the power managed module is an isochronous display sub-system of a personal computer.

In another aspect, a method comprises generating status information of a first circuit, the first circuit in a first dynamic clock domain of a plurality of dynamic clock domains; shadowing the status information of the first circuit in a second circuit coupled to the first circuit, the second circuit outside the first dynamic clock domain; executing software instructions for generating a request for the status information of the first circuit in a processor coupled to the second circuit; transmitting the request for the status information of the first circuit to the second circuit; and transmitting the shadowed status information from the second circuit to the processor.

A potential advantage in the exemplary embodiment is that by reading the shadowed status information of the power managed module from the shadow unit, the software need not "bother" the power managed module while the module is busy processing data. Further, even if software desires to read status information for the power managed module while the power managed module is idle or disabled, the clock management unit need not re-enable or wake up the power managed module just to read the status of the power managed module.

Further, in an exemplary embodiment, shadowing the status of the graphics engine in the clock management unit reduces power drawn by the system because one or more modules of the graphics engine may be disabled for relatively more time than might otherwise be possible. The exemplary clock management circuit (shadow unit) draws little power and the power managed module in the graphics engine draws comparatively large amounts of power. Without the system and method presently disclosed, the power managed module might need to remain enabled merely so that software can read status information of the module. Alternatively, without the system and method presently disclosed, the clock management unit might need to wake up the disabled power managed module just so that software can read the status of the module. Therefore, shadowing the status of the power managed module in the clock management unit may reduce power because the module may be disabled relatively more often.

DETAILED DESCRIPTION OF THE INVENTION

Exemplary Computing Architecture

Figure 1:
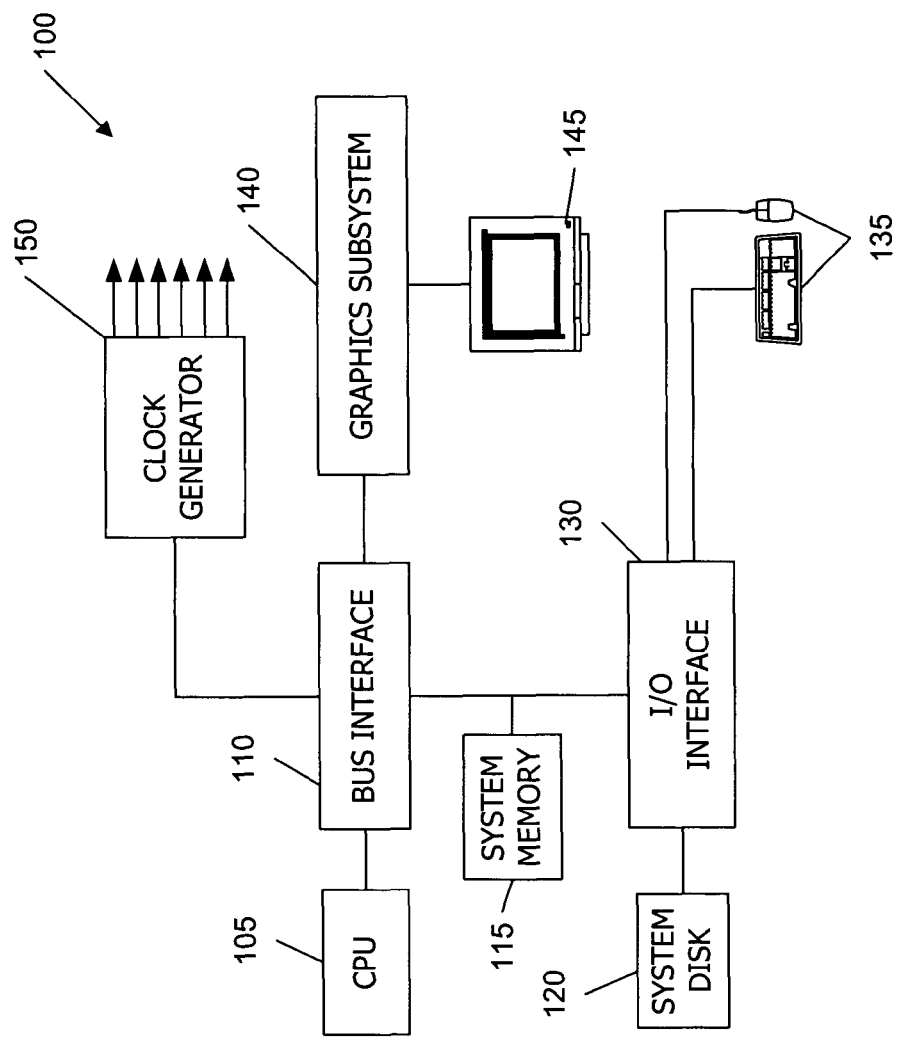
FIG. 1 is a generalized block diagram of a computer system in the prior art.
Figure 2:
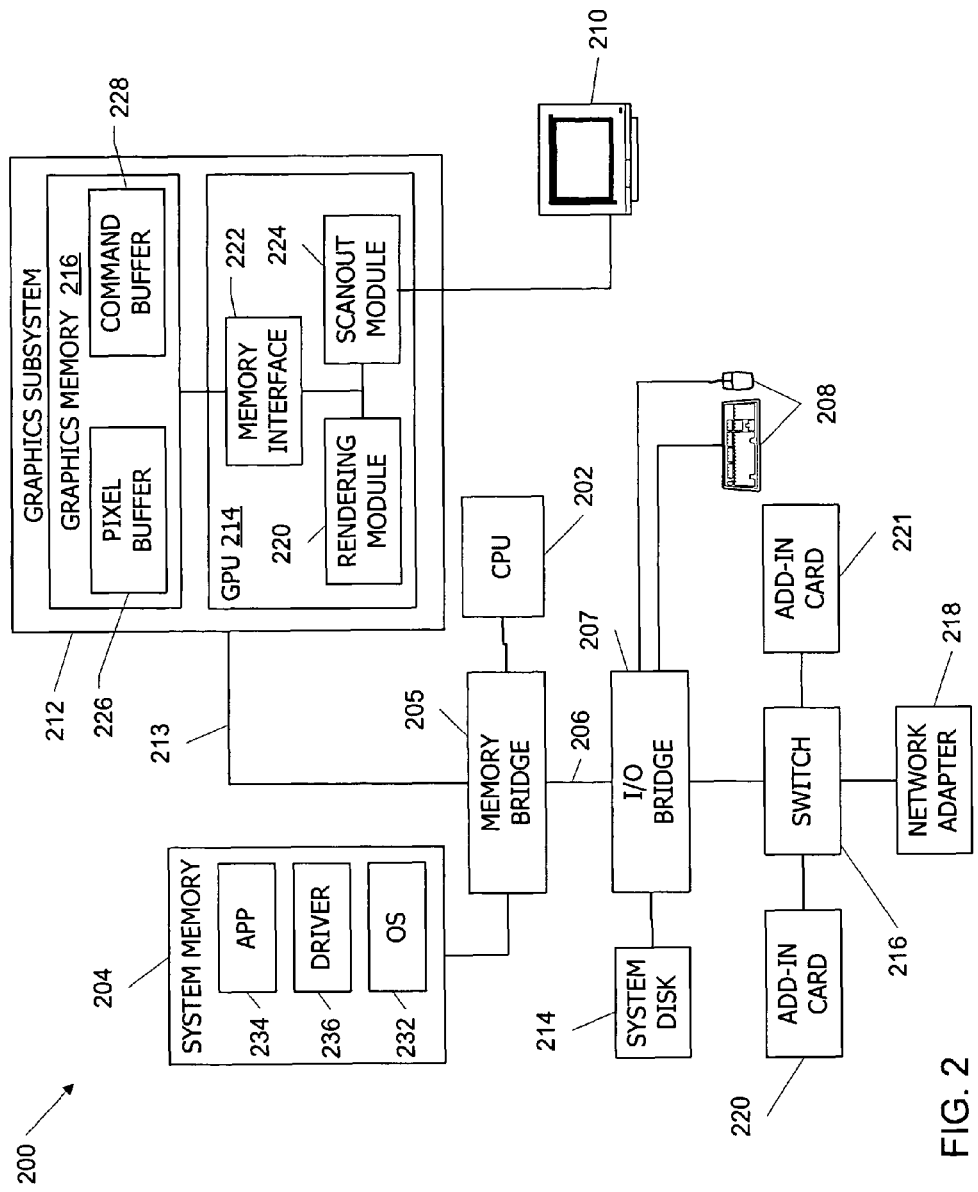
FIG. 2 is a block diagram of a computer system 200 according to an embodiment of the present invention.

FIG. 2 is a block diagram of a computer system 200 according to an embodiment of the present invention. Computer system 200 is merely exemplary, and a number of alterations may be made to computer system 200. Computer system 200 includes a central processing unit (CPU) or control processor 202 and a system memory 204 communicating via a communications path that includes a memory bridge 205. Memory bridge 205 (e.g. a Northbridge chip) is connected via a communication path 206 (e.g., a point-to-point connection using the HyperTransport protocol) to an I/O (input/output) bridge 207. I/O bridge 207 (e.g. a Southbridge chip) receives user input from one or more user input devices 208 (e.g., keyboard, mouse) and forwards the input to CPU 202 via communication path 206 and memory bridge 205. Visual output is provided on a pixel based display device 210 (e.g., a CRT or LCD based monitor) operating under control of a graphics subsystem 212 coupled to memory bridge 205 via communication path 213, which may be implemented using, e.g., PCI Express (PCI-E), Accelerated Graphics Port (AGP), or any other point-to-point or bus protocol. A system disk 214 is also connected to I/O bridge 207. A switch 216 provides connections between I/O bridge 207 and other components such as a network adapter 218 and various add-in cards 220, 221. Other components (not explicitly shown), including USB or other port connections, CD drives, DVD drives, and the like, may also be connected to I/O bridge 207. In various embodiments, connections among system components may be implemented using suitable protocols such as PCI (Peripheral Component Interconnect), PCI-E, AGP, HyperTransport, or any other point-to-point or bus protocol(s), and connections between different devices may use different protocols as is known in the art.

Graphics processing subsystem 212 includes an isochronous pipelined processor with deterministic control for generating images on display device 210. As used herein, an isochronous processor includes any data processing device that is configured to receive input data and/or deliver output data on a prescribed schedule. For instance, isochronous graphics processing subsystem 212 may be configured to deliver output signals to display device 210 at a prescribed frame rate, which may be a programmable rate. An isochronous pipelined graphics processor is further described in U.S. patent application Ser. No. 10/901,887, filed Jul. 28, 2004, entitled "Isochronous Pipelined Processor with Deterministic Control," which is incorporated by reference herein as if set forth fully. To focus on the present invention the isochronous pipelined graphics processor is described generally below, with specific details believed to be unnecessary to understanding of the present invention omitted from the present disclosure.

Graphics processing subsystem 212 includes graphics processing unit (GPU) 214 and graphics memory 216, which may be implemented, e.g., using one or more programmable processors, application specific integrated circuits (ASICs), and memory devices. GPU 214 includes rendering module 220, memory interface 222, and scanout module 224. Rendering module 220 may be configured to perform various tasks related to generating pixel data from graphics data (e.g., implementing various 2D and or 3D rendering algorithms), interacting with graphics memory 216 to store and update pixel data, and the like. Memory interface 222, which communicates with rendering module 220 and scanout module 224, manages all interactions with graphics memory 216. Memory interface 222 may also include pathways for writing pixel data to graphics memory 216 without processing by rendering module 220.

Graphics memory 216 contains pixel buffer 226 and command buffer 228. Pixel buffer 226 stores pixel data for an image that is read and processed by scanout module 224 and transmitted to display device 210. Pixel data may be generated, e.g., from 2-D or 3-D scene data provided to rendering module 220 or generated by various processes executing on CPU 202 and provided to pixel buffer 226. Pixel buffer 226 can be double-buffered so that while data for a first image is being read for display from a "front" buffer, data for a second image can be written to a "back" buffer without affecting the currently displayed image. Command buffer 228 queues commands received for execution by rendering module 220 and/or scanout module 224. Other portions of graphics memory 216 may be used to store data required by GPU 214 (such as texture data, color lookup tables, etc.), executable program code for GPU 214 and so on.

Scanout module 224, which may be integrated in a single chip with GPU 214 or implemented in a separate chip, reads pixel color data from pixel buffer 226, processes the data, and transfers the processed pixel data to display device 210 to be displayed. In one embodiment, scanout module 224 operates isochronously, scanning out frames of pixel data at a prescribed refresh rate (e.g., 80 Hz) regardless of any other activity that may be occurring in GPU 214 or elsewhere in system 200. In some embodiments, the prescribed refresh rate can be a user selectable parameter and the scanout order may be varied as appropriate to the display format (e.g., interlaced or progressive scan). Scanout module 224 may also perform other operations, such as adjusting color values for particular display hardware and/or generating composite screen images by combining the pixel data from pixel buffer 226 with data for a video or cursor overlay image or the like, which may be obtained, e.g., from graphics memory 216, system memory 204, or another data source (not shown). Such operations are performed in a display pipeline of scanout module 224.

During operation of system 200, CPU 202 executes various programs (temporarily) resident in system memory 204. In one embodiment, these programs include one or more operating system (OS) programs 232, one or more application programs 234, and one or more driver programs 236 for graphics processing subsystem 212. Although these programs are shown as residing in system memory 204, the invention is not limited to any particular mechanism for supplying program instructions for execution by CPU 202. For instance, at any given time some or all of the program instructions for any of these programs may be present within CPU 202 (e.g., in an on-chip instruction cache and/or various buffers and registers), in a page file or memory mapped file on system disk 214, and/or in other storage space.

Application program 234 may be, for instance, a video game program that generates graphics data and invokes appropriate rendering functions of GPU 214 (e.g., rendering module 220) to transform graphics data to pixel data. Application program 234 may generate and provide pixel data to graphics processing subsystem 212 for display. It is to be understood that any number of application programs that generate pixel and/or graphics data may execute concurrently on CPU 202. Operating system programs 232 (e.g., the Graphical Device Interface (GDI) component of the Microsoft Windows operating system) may also generate pixel and/or graphics data to be processed by graphics processing subsystem 212. Driver program 236 enables communication with graphics processing subsystem 212, including both rendering module 220 and scanout module 224. Driver program 236 advantageously implements one or more standard application program interfaces (APIs), such as Open GL, Microsoft DirectX, or D3D for communication with graphics processing subsystem 212; any number or combination of APIs may be supported, and in some embodiments separate driver programs 236 are provided to implement different APIs.

By invoking appropriate API function calls, operating system programs 232 and/or application programs 234 are able to instruct driver program 236 to transfer graphics data or pixel data to graphics processing subsystem 212, to control operations of rendering module 220, to modify state parameters for scanout module 224, to retrieve status information from the various modules of graphics processing subsystem 212, and so on. The specific commands and/or data transmitted to, or status information received from, graphics processing subsystem 212 by driver program 236 in response to an API function call may vary depending on the implementation of GPU 214.

In some embodiments, command buffer 228 queues commands received for execution by GPU 214. More specifically, driver program 236 may write a command stream to command buffer 228; the stream may include rendering commands and data for rendering module 220, state commands for scanout module 224, or status requests of modules of graphics processing subsystem 212. Command buffer 228 may include logically and/or physically separate sections for commands directed to rendering module 220 and commands directed to scanout module 224, or commands may be intermixed in command buffer 228 and directed to the appropriate pipeline by suitable control circuitry within GPU 214.

It will be appreciated that the system shown herein is illustrative and that variations and modifications are possible. The bus topology, including the number and arrangement of bridges, may be modified as desired. For instance, in some embodiments, system memory 204 is connected to CPU 202 directly rather than through a bridge, and other devices communicate with system memory 204 via memory bridge 205 and CPU 202. In other alternative topologies, graphics subsystem 212 is connected to I/O bridge 207 rather than to memory bridge 205. In still other embodiments, I/O bridge 207 and memory bridge 205 might be integrated into a single chip. The particular components shown herein are optional; for instance, any number of add in cards or peripheral devices might be supported. In some embodiments, switch 216 is eliminated, and network adapter 218 and add in cards 220, 221 connect directly to I/O bridge 207.

The connection of GPUs 214 to the rest of system 200 may also be varied. In some embodiments, graphics subsystem 212 is implemented using one or more expansion cards that can be inserted into expansion slots of system 200, with one or more GPUs 214 on each card. In other embodiments, one or more of GPUs 214 is integrated on a single chip with a bus bridge, such as memory bridge 205 or I/O bridge 127.

Each GPU 214 may be provided with any amount of local graphics memory, including no local memory, and may use local memory and system memory in any combination. For instance, in a unified memory architecture (UMA) embodiment, little or no dedicated graphics memory is provided, and some or all of the GPUs may use system memory exclusively or almost exclusively. In UMA embodiments, a GPU may be integrated into a bus bridge chip or provided as a discrete chip with a high speed bus (e.g., PCI E) connecting the GPU to the bridge chip and system memory.

In addition, graphics subsystems embodying aspects of the present invention may be incorporated into a variety of devices, including general purpose computer systems, video game consoles and other special purpose computer systems, DVD players, handheld devices such as mobile phones or personal digital assistants, and so on.

Autonomous Power Management

Figure 3:
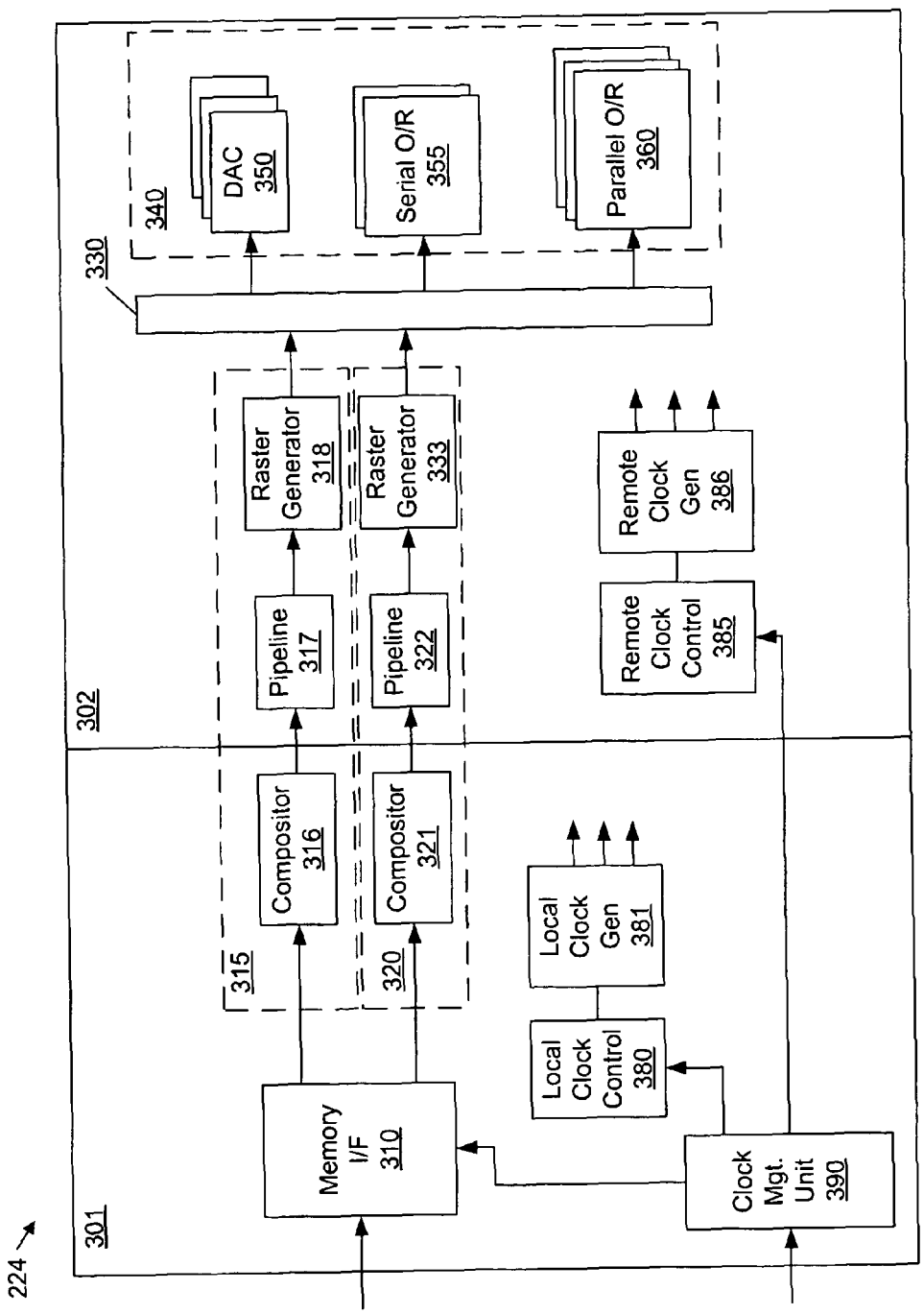
FIG. 3 illustrates further detail of scanout module 224 of FIG. 2 including a clock management unit 390 configured to shadow status information for dynamic clock domains in scanout module 224, in one embodiment in accordance with the present invention.

FIG. 3 illustrates further detail of scanout module 224 of FIG. 2 including a clock management unit 390 configured to shadow status information for dynamic clock domains in scanout module 224, in one embodiment in accordance with the present invention. In this embodiment, scanout module 224 is partitioned into two physical integrated circuits (ICs), local IC 301 and remote IC 302. However, scanout module 224 may comprise one or any number of ICs.

To process pixel data for display 210, memory interface 310 receives data for processing by one or both of two parallel pixel processing heads, first head 315 and second head 320. In some embodiments, heads 315 and 320 may simultaneously drive up to two displays 210, for example. Head 315 includes compositor 316, data pipeline 317, and raster generator 318. Similarly, head 320 includes, in parallel, compositor 321, data pipeline 322, and raster generator 333. To drive one or more displays 210, processed video data are output from the heads 315 and/or 320 via virtual crossbar 330 to one or more output resources 340, which include DACs 350, serial output resources 355, and parallel output resources 360.

Local clock control module 380 in conjunction with local clock generator 381 selectively supplies clocks for distribution within local IC 301. Similarly, remote clock control module 385 in conjunction with remote clock generator 386 selectively supplies clocks for distribution within remote IC 302. Although depicted and described as separate modules, in some embodiments local clock control module 380 has all or parts of its functions integrated into local clock generator 381, and remote clock control module 385 has all or parts of its functions integrated into remote clock generator 386. As described further herein, selective clock distribution is controlled by clock management unit 390.

As described further herein, the processing engines of scanout module 224 are power hungry devices. In some embodiments, each IC of scanout module 224 consumes about 50 watts. Including other components, graphics processing subsystem 212 (FIG. 2) consumes up to 225 watts at full processing load, for example while a user plays a graphics-intensive video game. However, the processing engines of scanout module 224 often have little work to do for other periods, for example while the user is working on a text document in a text editor, in which the graphics on display device 210 appear as an almost static screen.

In order to reduce power drawn by graphics processing subsystem 212, clock management unit 390 may autonomously disable clocks to one or more portions of scanout module 224 while those portions are not needed, as described further herein.

In some embodiments, clock management unit 390 is configured to determine, based on commands and/or data received by scanout module 224, which portions of scanout module 224 need to be enabled in an upcoming period, and which portions will be idle in the upcoming period. Depending upon the functions to be performed by the various components within scanout module 224 in the upcoming period, clock management unit 390 dynamically determines and controls the functional configuration (which portions are functioning and which are idle) of scanout module 224. For the portions of scanout module 224 that will be functional in the upcoming period but that are currently idle, clock management unit 390 enables clocks to the circuitry in advance or coincident with the beginning of the upcoming period. For the portions of scanout module 224 that will be idle in the upcoming period, clock management unit 390 may disable one or more clocks to the idle circuitry.

In one embodiment, clock management unit 390 commands local clock control module 380 for local IC 301 and remote clock control module 385 for remote IC 302 according to the functional configuration. Clock management unit 390 therefore appropriately enables or disables one or more clocks supplied by local clock generator 381 and remote clock generator 386, respectively, to the various portions of scanout module 224.

To determine the functional configuration of scanout module 224 in the upcoming period, clock management unit 390 receives and interprets substantially all communications coming into scanout module 224. In some embodiments, clock management unit 390 directly receives state commands from CPU 202 indicating the functional configuration in the upcoming period. In other embodiments, clock management unit 390 receives commands and/or data indirectly, e.g., by "sniffing" bus traffic, and interprets the functional configuration therefrom. For example, software running on CPU 202 or graphics processing subsystem 212 may send commands and/or data via memory-mapped register writes to clock management unit 390. Clock management unit 390 determines state information for the upcoming period from the commands and/or data. The state information is updated atomically and becomes the functional configuration of scanout module 224. Based on the functional configuration, clock management unit 390 determines those portions of scanout module 224 that need to be enabled or may be disabled in the upcoming period.

In a specific example, if a software command is interpreted by clock management unit 390 as indicating that software intends to write to a register in head 315 in an upcoming register write period, and clocks to head 315 are currently disabled, then clock management unit 390 enables the clocks a predetermined time before transmitting the data to the register in head 315. Once the register is written to, clock management unit 390 can disable clocks to head 315 if there are no more registers to be written in head 315. In another example, clock management unit 390 may determine that data will be written to configure one of the DACs 350 in an upcoming period. For the data to get from the clock management unit 390 to DAC 350, clock management unit 390 enables the appropriate clocks to DAC 350, and clock management unit 390 will then write to DAC 350 in the upcoming period. Once the data is written and there is no further data to be written to DAC 350, then clock management unit 390 may disable clocks to DAC 350.

To effectively manage various functional hardware configurations in clock management unit 390, resources in scanout module 224 are subdivided into a predetermined number of discrete dynamic clock domains. In one embodiment, clocks to clock management unit 390, memory interface 310, local clock control module 380, and remote clock control module 385 comprise an always-on clock domain supplied with 400 MHz clocks, where "always on" means that the modules in the clock domain are on for substantially all of the time that graphics processor subsystem 212 is powered on. A first dynamic clock domain comprises head 315 display logic (compositor 316, data pipeline 317, and raster generator 318). A second dynamic clock domain comprises head 320 display logic (compositor 321, data pipeline 322, and raster generator 333). Each clock domain may include multiple clock frequencies or phases. For example, raster generators 318 and 333 may receive clocks different from and/or in addition to the clocks supplied to compositors 316 and 321 and data pipelines 317 and 322. Other clock domains may be predetermined for one or more of output resources 340 such as DACs 350, serial output resources 355, and parallel output resources 360 that operate independently of each other but that operate in conjunction with head 315 display logic and/or head 320 display logic. Other clock domains may include other logic in scanout module 224, for example logic or circuitry that is not specific to any head or output resources.

Clock management unit 390 advantageously acts as a single coordination point that synchronizes software and hardware with respect to sending commands to and/or reading status from power controlled modules in scanout module 224. For example, it is possible for different threads of software on CPU 202 (FIG. 2) to conflict in their respective determinations to read status for various portions of the hardware modules in scanout module 224, and there is generally no single mechanism of hardware state management in software. Advantageously, clock management unit 390 can be seen as enforcing order over the chaos of software. Autonomous clock management is further described in co-pending U.S. Provisional Patent Application No. 60/794,221, filed Apr. 20, 2006, entitled "Work based clock management for display sub-system," which is hereby incorporated by reference for all purposes as if set forth fully.

Shadowing Engine Status

In some embodiments, clock management unit 390 provides substantially all upstream communications, for example to software running on CPU 202 or other processing resources in computer system 200 (FIG. 2). So that software components such as drivers can access status information for a power managed module in scanout module 224 independent of the state of the power managed module, the status information is shadowed in clock management unit 390, for example in one or more registers in clock management unit 390. Status information may therefore be reported back to the driver even if the power managed module is disabled.

One of the issues with waking up a power managed module to read a status of the module is that the time to re-enable the power managed module and read from a status register in the module may be much longer than the read cycle for the status register in the module. For example, clock management unit 390 may re-enable the module by re-enabling clocks to the module, waiting for the module to re-initialize and for clocks to stabilize. Then, clock management unit 390 may issue a read command for the appropriate status register in the module, read status information from the register in the module, and respond to software with the status information. Once the read cycle is complete, the module might still be idle for the upcoming period so clock management unit 390 can again disable the module, which has some latency. Therefore, reading a status register of a disabled power managed module may take significantly longer than just a read cycle for the appropriate status register in the module. Additionally, re-enabling the module takes significantly more power than is required to merely read the status register in the module.

Figure 4:
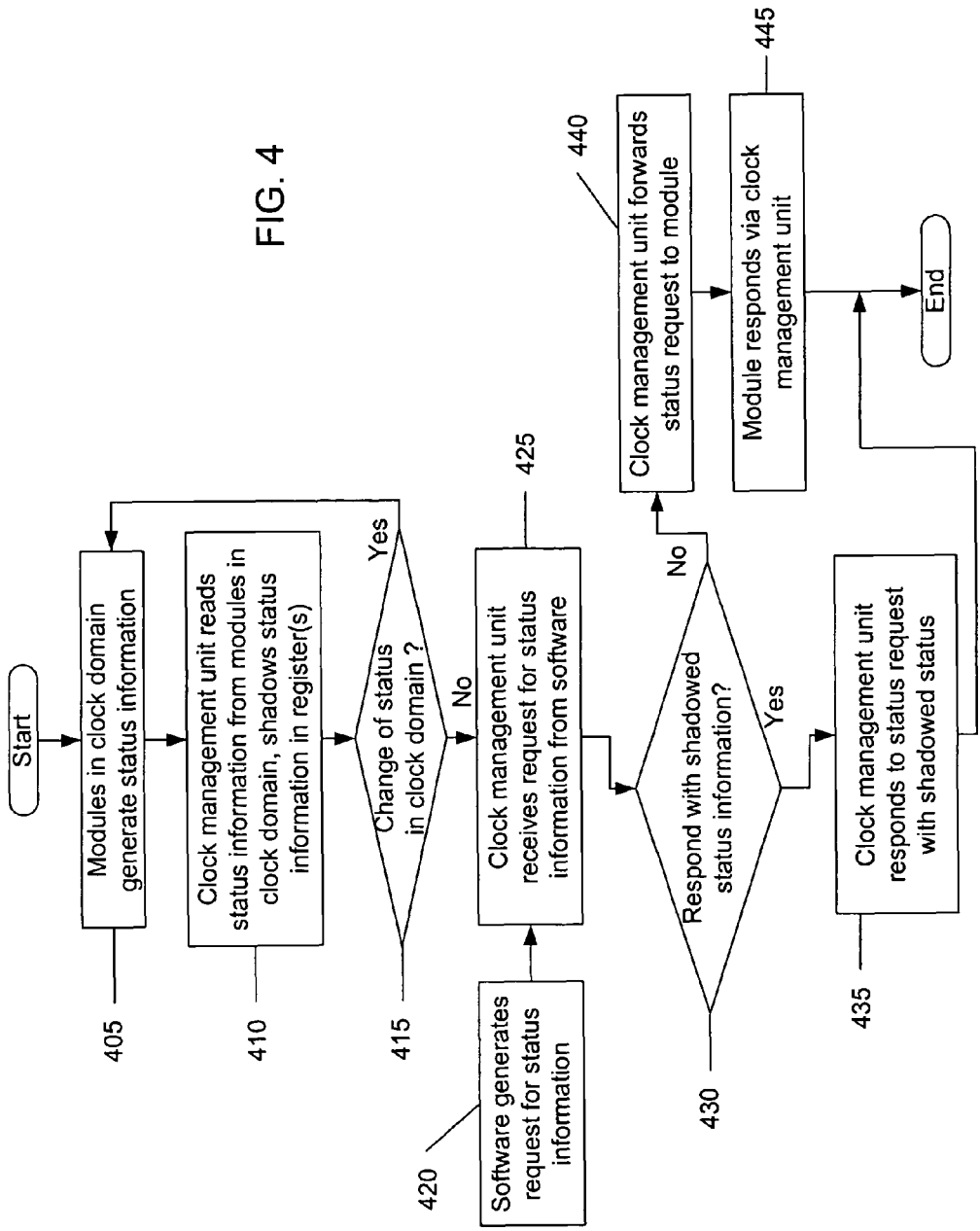
FIG. 4 illustrates a method for shadowing status information in clock management unit 390 for a module in a dynamic clock domain, e.g. head 315 of FIG. 3, in one embodiment in accordance with the present invention.

FIG. 4 illustrates a method for shadowing status information in clock management unit 390 for a module in a dynamic clock domain, e.g. head 315 of FIG. 3, in one embodiment in accordance with the previous invention. Assuming that head 315 is not idle, then at step 405, compositor 316, pipeline 317, and raster generator 318 of head 315 (i.e., the submodules in the clock domain) generate status information corresponding to the current operational state of the submodules. At step 410, clock management unit 390 reads the status information from head 315 and shadows the status information, for example by storing the status information in one or more registers. At step 415, if there is a change in the status of the clock domain, for example, a change from "busy" to "stalled" in pipeline 317, then at step 405 the submodule that changed its status (e.g., pipeline 317) generates updated status information. At step 410, the updated status information is shadowed in the clock management unit 390. In steps 405 to 415, therefore, if any submodule in the clock domain changes operational state, clock management unit 390 shadows the updated status. Advantageously, steps 405 to 415 provide for clock management unit 390 to be "aware" of current status even if state changes occur in modules in the dynamic clock domain.

With respect to software-requested status information, at step 420 a software component (e.g. driver) generates a request for status information for one or more of the submodules in the dynamic clock domain (e.g. the number of primitives in pipeline 317). At step 425, clock management unit 390 receives the request for status information from the driver.

In some embodiments, as depicted in steps 420 to 435 and described further below, software such as a driver on CPU 202 can poll clock management unit 390 for summary status information without polling a module for detailed status information. For example, if the module is idle, as shown by the status shadowed in clock management unit 390, then the driver can stop polling. On the other hand, as depicted in steps 420 to 430 and 440 to 445 and described further below, if the module (e.g. head 315) is not idle as shown by the shadowed information in clock management unit 390, the driver can poll further status information directly from head 315 (e.g., to determine number of primitives, etc.).

At step 430, clock management unit 390 determines whether to respond with shadowed information. In some embodiments, clock management unit 390 shadows all or substantially all status information in real time, so that the power managed modules of the dynamic clock domain can run independently of the status request and need not detour or otherwise be interrupted to respond to the status request. Because clock management unit 390 is in the path for the status information between the module of the dynamic clock domain and the driver, clock management unit 390 can shadow the status information so that, if the module is disabled during a subsequent status request by the driver, the clock management unit 390 can respond with the shadowed status information. In some embodiments, clock management unit 390 responds with shadowed information where the status is reflective of the current state of the module, such as for state information that changes relatively slowly (e.g. whether the current status of head 315 as busy, stalled, or idle).

In other embodiments, clock management unit 390 can respond to the status request with derived status. Status of submodules may be determined or inferred from status information for the module of which the submodule is a part. For example, if head 315 is idle and the status request is for the number of primitives in pipeline 317, clock management unit 390 can respond that the number of primitives is zero. As another example, if head 320 is idle, then all submodules (compositor 321, pipeline 322, and raster generator 333) in head 320 are idle as well. Further, once a module (e.g., head 320) is idle, the operational status of the module will not change unless state commands for the module indicate to clock management unit 390 that the module will be enabled for the upcoming period.

In some embodiments, the status of the submodules can be "rolled up" into an aggregate module status in clock management unit 390. In this way, status of the module may be determine from the status of the submodules. For example, module status information for head 315 may include the individual states: busy (e.g., head 315 is currently processing pixel data), stalled (e.g., waiting on data), idle (e.g., clocks are enabled but head 315 is not processing), and off (e.g., head 315 clocks disabled). If status for pipeline 317 includes a non-zero number of primitives in pipeline 317, then clock management unit 390 can determine that the status of head 315 is busy and not stalled, idle, or off.

The determination of the status of submodules based upon the status of the module, or conversely, the determination of the status of the module based upon the status of the submodules, can be performed in any combination of hardware or software elements. For example, the clock management unit 390 may contain a hardware logic circuit that, upon a request from a driver for the status of head 315, first determines that the number of primitives in pipeline 317 is non-zero, then sets the status of head 315 as "busy" in or more registers.

Because clock management unit 390 replies to the driver with shadowed status information, a driver attempting to read the shadowed status information need not "bother" the power managed module (e.g., head 315 display logic) while the power managed module is busy processing data. Further, even if the driver desires to read status information for a disabled power managed module, there is no need to re-enable or wake up the power managed module just to read its status. For example in some embodiments, an interrupt servicing routine running on CPU 202 may respond to an interrupt by scanning status information of scanout module 224 to determine the cause of the interrupt (e.g., head 315 is stalled). Clock management unit 390 can respond to the interrupt servicing routine with the stalled status of head 315, for example, without waking up previously disabled head 320.

As noted above, alternatively at step 430, clock management unit 390 in some embodiments may determine to not respond with shadowed status information. In such embodiments, clock management unit 390 forwards the status request to the appropriate submodule(s) in the clock domain (e.g., pipeline 317). At step 445, the submodule (pipeline 317) responds via clock management unit 390 to software (e.g. with the number of primitives). Clock management unit 390 shadows the status information sent from the submodule or module, so that upon subsequent reception of a request for status for the module from a driver, clock management unit 390 may respond with shadowed status information.

Alternative Embodiments

Although described as shadowing status in one or more registers, clock management unit 390 may store to one or more memories within computer system 200, such as system memory 204. A potential issue with shadowing to system memory 204 is loss of coherency, in which at some points in time the data in memory does not correlate to the status (e.g. due to race conditions). For example, race conditions can occur if the latency of storing to memory and reading from the memory exceeds the time for a module to change operational state. However, for status indications that change relatively infrequently, or for status that is polled relatively infrequently by software, coherency may not be an issue.

In another alternative, clock management unit 390 includes two registers for each power managed module, one register to shadow status while clocks are enabled to the module, and another register to shadow status while clocks are disabled for the module ("clock stopped").

Advantageously, the systems and methods described with respect to FIGS. 2 to 4 allow software running on CPU 202 (FIG. 2) to determine status for one or more modules of graphics processing subsystem 212, even if the modules are disabled by clock management unit 390 to save power. Further, there is no need to enable a disabled module just so that software can read the status of the disabled module.

A further advantage is improved reliability in graphics processing subsystem 212 because the modules are not enabled merely to read the status of the modules. In graphics processing subsystem 212, various areas of the integrated circuit chip(s) heat or cool based on whether the circuits in those areas are enabled or disabled. Arbitrarily turning circuitry on/off within the chip(s) can lead to thermal stress. The systems and methods described with respect to FIGS. 2 to 4 provide for the dynamic clock domains to remain off when they are not needed, reducing thermal stress.

Although specifically described with respect to scanout module 224 of graphics processing subsystem 212, the systems and methods disclosed herein apply generically to virtually any circuitry in which the circuitry is divided into a number of dynamic clock domains, with a clock management component for shadowing status of the clock domains. Thus, while the invention has been described with respect to specific embodiments, it will be appreciated that the invention is intended to cover all modifications and equivalents within the scope of the following claims.

What is claimed is:

1. A system, comprising:
a first circuit in a first dynamic clock domain of a plurality of dynamic clock domains;
a processor configured to execute software instructions to generate a request for a status of the first circuit;
a second circuit coupled to the first circuit and to the processor, the second circuit outside the first dynamic clock domain, the second circuit being configured to selectively enable or disable a clock signal to the first dynamic clock domain based on communications received from the processor, wherein the first circuit is disabled when the clock signal to the first dynamic clock domain is disabled,
the second circuit being further configured to shadow a status of the first circuit and to respond to the request for the status of the first circuit based on the shadowed status regardless of whether the first circuit was disabled.

2. The system of claim 1, wherein the second circuit is further configured to update the shadowed status of the first circuit upon a state change of the first circuit.

3. The system of claim 1, wherein the second circuit comprises one or more registers configured to store the shadowed status of the first circuit.

4. The system of claim 1, wherein the second circuit is further configured to receive a command for the first circuit from the processor and transmit the command to the first circuit.

5. The system of claim 1, wherein the first dynamic clock domain draws a relatively larger amount of power than the second circuit if the clock signal to the first dynamic clock domain is not disabled.

6. The system of claim 1, wherein the status of the first circuit comprises a status of a submodule of the first circuit.

7. The system of claim 1, wherein the first circuit comprises at least a first submodule, and wherein the second circuit is further configured to determine the status of the first circuit based at least upon a status of the first submodule.

8. The system of claim 1, wherein the first circuit comprises at least a first submodule, and wherein the second circuit is further configured to determine the status of the first submodule based at least upon a status of the first circuit.

9. The system of claim 1, wherein the first circuit is a component of an isochronous graphics engine.

10. The system of claim 1, wherein the second circuit is further configured to transmit the request for status of the first circuit to the first circuit and thereafter to transmit the status of the first circuit from the first circuit to the processor.

11. The system of claim 1, wherein the second circuit is in an always-on clock domain.

12. A method, comprising:
generating status information of a first circuit, the first circuit being in a first dynamic clock domain of a plurality of dynamic clock domains;
shadowing the status information of the first circuit in a second circuit coupled to the first circuit, the second circuit outside the first dynamic clock domain;
determining, by the second circuit, whether to enable or disable a clock signal to the first dynamic clock domain, wherein the first circuit is disabled when the clock signal to the first dynamic clock domain is disabled and wherein the determination is based at least in part on communications received from a processor coupled to the second circuit;
executing in the processor coupled to the second circuit software instructions for generating a request for the status information of the first circuit;
transmitting the request for the status information of the first circuit from the processor to the second circuit; and
transmitting the shadowed status information from the second circuit to the processor, regardless of whether the first circuit is enabled or disabled.

13. The method of claim 12, wherein shadowing the status information of the first circuit comprises detecting a state change of the first circuit.

14. The method of claim 12, wherein shadowing the status information of the first circuit comprises storing the status information in one or more registers.

15. The method of claim 12, further comprising:
receiving into the second circuit a request for the status information of the first circuit from the processor; and
transmitting the request for the status information of the first circuit from the second circuit to the first circuit.

16. The method of claim 12, wherein the first circuit comprises at least a first submodule, the method further comprising determining in the second circuit the status of the first circuit based at least upon a status of the first submodule.

17. The method of claim 12, wherein the first circuit comprises at least a first submodule, the method further comprising determining in the second circuit the status of the first submodule based at least upon a status of the first circuit.

18. The method of claim 12, further comprising transmitting by the second circuit, the request for the status information of the first circuit to the first circuit.

19. The method of claim 12, wherein the second circuit is in an always-on clock domain.

20. A system, comprising:
a first processing module in a first dynamic clock domain;
a second processing module in a second dynamic clock domain; and
a clock management unit in a clock domain outside the first and second dynamic clock domains, the clock management unit configured to selectively enable or disable a first clock signal to the first dynamic clock domain and to selectively enable or disable a second clock signal to the second dynamic clock domain based on communications received from a central processor, wherein the first processing module is disabled when the first clock signal is disabled and the second processing module is disabled when the second clock signal is disabled,
the clock management unit being further configured to shadow a status of each of the first and second processing modules,
the clock management unit being further configured to receive software instructions from the central processor, the software instructions including a status request instruction requesting a status of the first processing module, and to respond to the status request instruction based on the shadowed status of the first processing module.

21. The system of claim 20, wherein the clock management unit is in an always-on clock domain.

* * * * *